(No Model.)
2 Sheets—Sheet 1.
E. E. FULLER.
BALING PRESS.
No. 267,871.    Patented Nov. 21, 1882.
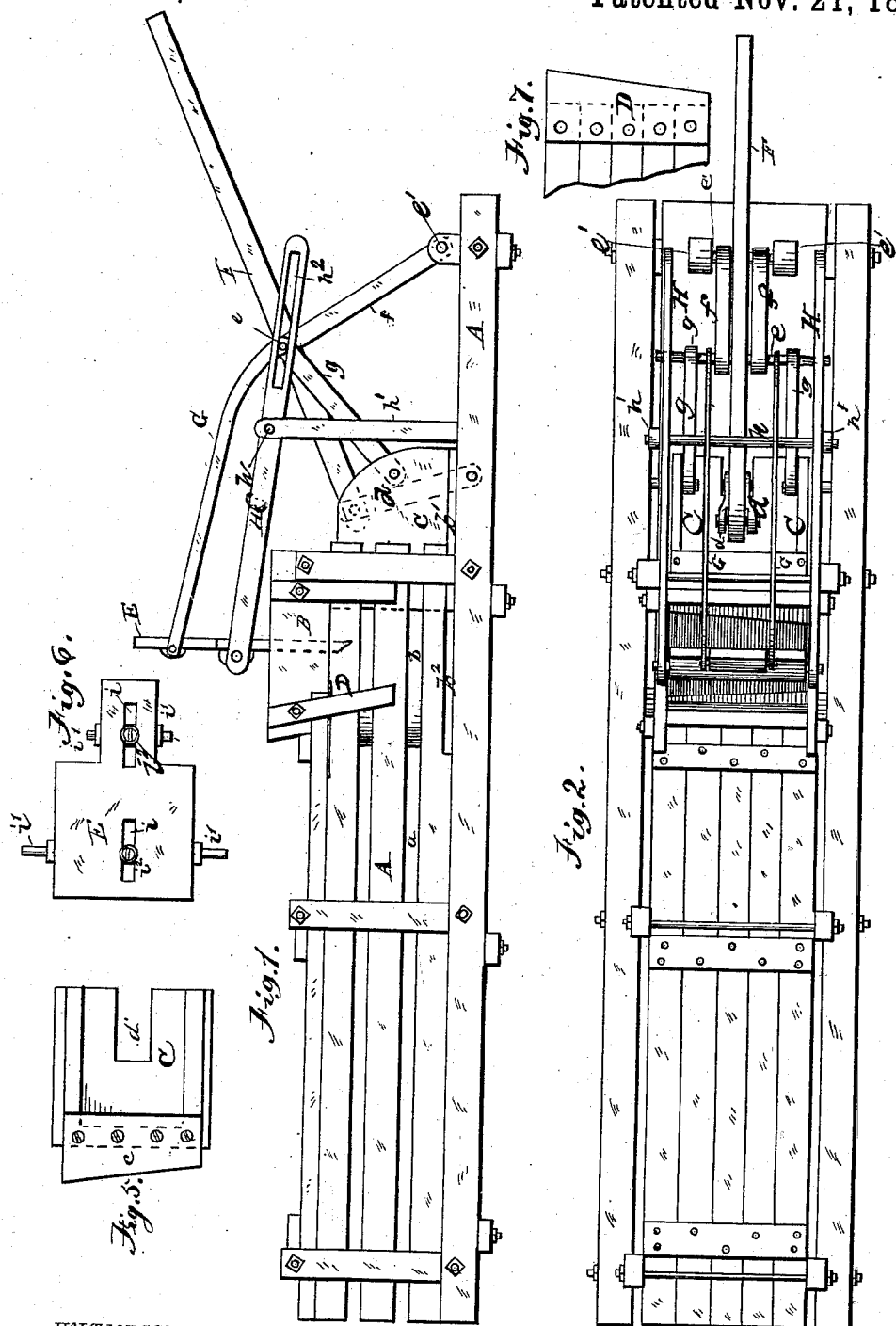
WITNESSES
F. H. Knight
Harry Bernhard
INVENTOR
Eben E. Fuller
By Edson Bros.
His Attorneys (No Model.) 2 Sheets—Sheet 2.

E. E. FULLER.
BALING PRESS.

No. 267,871. Patented Nov. 21, 1882.

WITNESSES
F. H. Knight
Harry Bernhard

INVENTOR
Eben E. Fuller
By Edson Bro's
his Attorneys

UNITED STATES PATENT OFFICE.

EBEN E. FULLER, OF ELK RIVER, MINNESOTA.

BALING-PRESS.

SPECIFICATION forming part of Letters Patent No. 267,871, dated November 21, 1882.

Application filed May 1, 1882. (No model.)

*To all whom it may concern:*

Be it known that I, EBEN E. FULLER, a citizen of the United States, residing at Elk River, in the county of Sherburne and State of Minnesota, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 3:
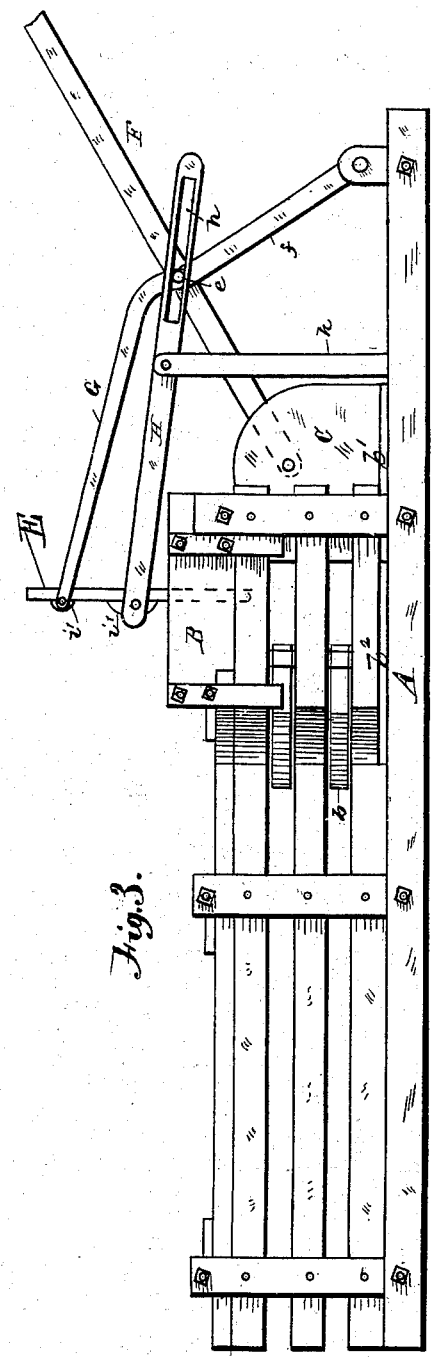
Figure 4:
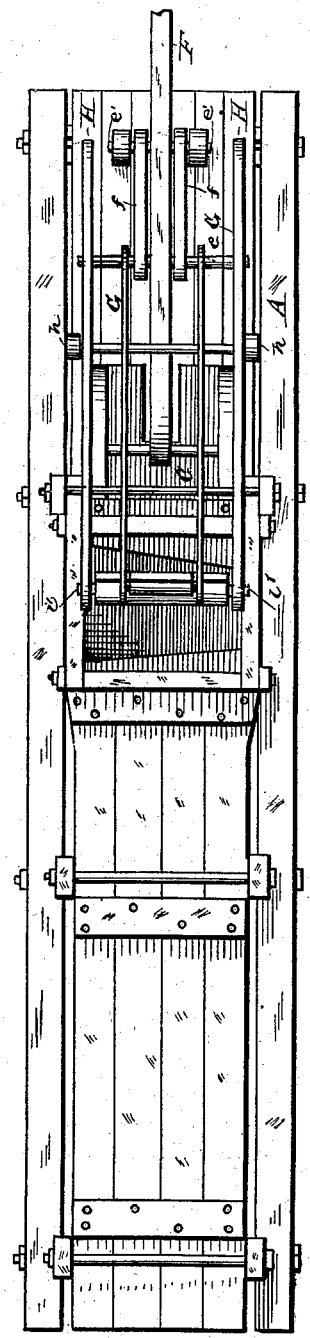
Figure 5:
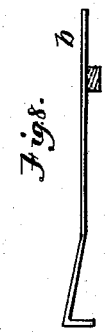

Figure 1 is a side view of my improved fuel and hay press. Fig. 2 is a plan view. Figs. 3 and 4 are modifications thereof, and Figs. 5, 6, 7, and 8 are detail views of the same.

This invention has relation to improvements in fuel and hay presses, having for its object to effect the feeding and cutting of the material and forcing it into the baling-chamber; and it consists in the combination and arrangement of parts substantially as hereinafter more fully set forth and claimed.

To carry out my invention I employ, in common with others, a rectangular baling-chamber, A. In its sides are slots $a$, extending throughout its length, to permit the passage around the forming-bale of the binding or baling cord or metal straps. At a point a short distance inward from the front end of the chamber A are arranged holding-dogs $b$. (Shown in Fig. 8.) These are adapted to permit the forcing of the material past their farther ends by the follower, and prevent its return when the follower is withdrawn therefrom. At the upper forward end of the baling-chamber A is arranged the hopper B, through which the material is fed into the said chamber.

C is the follower, arranged to move within the chamber A, and having at its upper end a knife, $c$, which moves after the fashion of the blades of shears past a second knife, D. Flanges $b'$, projecting from the follower into slots $b^2$ of the sides of the chamber A, guide the follower in its movement. The knife D is affixed at a point just in rear of the lower end of hopper B, by which the material—hay or fuel—is cut, preparatory to baling immediately after the feeding of the same into the chamber through the hopper, as the two knives come together, while after the cutting it is forced by the follower past the dogs.

E is a folder or plunger, (clearly shown in Figs. 1 and 6,) adapted to operate vertically in the hopper B and feed the supplied material through the hopper into the chamber A. The folder and follower are operated by a common lever, F. This lever is connected to a toggle-lever, $d$, pivoted at the bottom of the chamber and working in a slot of the follower C, and has its fulcrum upon a cross-bar, $e$, to which are connected parallel toggle-levers $ff$, suitably pivoted at their lower ends upon the support of the chamber A. To the cross-bar of fulcrum $e$ are connected similar levers, $g\ g$, pivoted to the sides of the follower C.

G G are curved arms or bars, pivoted upon pins $e'$, passing through short uprights bolted to the base of the chamber A and to the sides of the folder E at its upper end.

H H are levers, fulcrumed upon a cross-rod, $h$, supported in the uprights $h'$, fastened to the base of the chamber A. The levers H are pivoted to the folder a short distance below the point of connection therewith of the arms or bars G, and have slots $h^2$ in their outer ends, which receive lever F, to permit the bars G to slide back and forth.

In Figs. 3 and 4 the toggle-levers $d$ and $f$ are omitted in effecting the operation of the follower and folder.

It will be noticed that the bar G and levers H are adjustably connected to the folder to vary its stroke, as may be desired, by means of slots $i\ i$, made in the folder, and cross-bars $i'$, having adjusting-screws and nuts $i^2$, said screws passing through said slots, and said rods forming the means of connecting said bar to the lever.

It will be further remarked that the knives of the hopper and follower are detachable, and can therefore be removed when the press is used for baling hay, the knives being used when the material is cut and baled for fuel.

It will also be noticed that both the bale-chamber and the hopper-opening can be reduced or enlarged in size, as may be desired, to form a larger or smaller bale, by the adjusting screw-bolts, as clearly shown in the drawings.

In order to more compactly press the bale the feeding-orifice of the hopper may be enlarged and the baling-chamber reduced in size by means of the aforesaid bolts, as will be observed by reference to Fig. 4 of the drawings.

Of course a head-block or head-blocks are used in the process of baling the hay or fuel, arranged within the baling-chamber A.

I claim and desire to secure by Letters Patent—

1. In a fuel and hay press, the combination of the follower having a knife, the chamber with the lower end of its hopper provided with a knife, and the folder adapted to operate as set forth.

2. The combination of the chamber having its hopper provided with a knife at its lower end, the folder, the follower having a knife, and their operating mechanism, substantially as and for the purpose set forth.

In testimony whereof I affix my signature in presence of two witnesses.

EBEN E. FULLER.

Witnesses:
H. M. ATKINS,
C. E. NASH.